(12) United States Patent
Shen et al.

(10) Patent No.: US 11,997,540 B2
(45) Date of Patent: May 28, 2024

(54) TECHNIQUES FOR DISPLAYING A RADIO ACCESS TECHNOLOGY STATUS INDICATION BASED ON BANDWIDTH METRICS

(71) Applicant: QUALCOMM Incorporated, San Diego, CA (US)

(72) Inventors: Liping Shen, San Diego, CA (US); Ajith Tom Payyappilly, San Diego, CA (US); Kuo-Chun Lee, San Diego, CA (US); Shanni Xi, San Diego, CA (US); Xinli Song, San Diego, CA (US); Sundaresan Tambaram Kailasam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 17/302,341

(22) Filed: Apr. 30, 2021

(65) Prior Publication Data
US 2022/0353744 A1 Nov. 3, 2022

(51) Int. Cl.
*H04W 28/20* (2009.01)
*H04W 28/02* (2009.01)
*H04W 28/082* (2023.01)
*H04W 76/16* (2018.01)

(52) U.S. Cl.
CPC ....... *H04W 28/20* (2013.01); *H04W 28/0257* (2013.01); *H04W 28/082* (2023.05); *H04W 76/16* (2018.02)

(58) Field of Classification Search
None
See application file for complete search history.

(56) References Cited

U.S. PATENT DOCUMENTS

| | | | |
|---|---|---|---|
| 2009/0088093 A1* | 4/2009 | Nentwig | H03F 1/3241 |
| | | | 455/114.3 |
| 2013/0132854 A1 | 5/2013 | Raleigh et al. | |
| 2017/0127308 A1* | 5/2017 | Li | H04W 24/10 |
| 2018/0049113 A1* | 2/2018 | Jung | H04L 5/0048 |
| 2018/0212740 A1* | 7/2018 | Bhorkar | H04L 1/0026 |

(Continued)

OTHER PUBLICATIONS

International Search Report and Written Opinion—PCT/US2022/071470—ISA/EPO—dated Jul. 8, 2022.

*Primary Examiner* — Lonnie V Sweet
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may determine that the UE is connected to a wireless network on a first carrier frequency in a first frequency range that is associated with a lower data rate than a second carrier frequency in a second frequency range. In some aspects, the first frequency range may be associated with a first version of a radio access technology (RAT) and the second frequency range may be associated with a second version of the RAT. The UE may determine a bandwidth metric associated with the first carrier frequency in the first frequency range. The UE may display a first visual indicator associated with the first version of the RAT or a second visual indicator associated with the second version of the RAT based on the bandwidth metric. Numerous other aspects are described.

30 Claims, 8 Drawing Sheets

(56) References Cited

U.S. PATENT DOCUMENTS

| | | | |
|---|---|---|---|
| 2018/0368016 A1 | 12/2018 | Lee et al. | |
| 2019/0053136 A1 | 2/2019 | Lee et al. | |
| 2019/0069229 A1 | 2/2019 | Lee et al. | |
| 2019/0149286 A1* | 5/2019 | Zhang | H04L 5/0007 |
| | | | 370/329 |
| 2020/0162211 A1* | 5/2020 | Wang | H04W 72/0426 |
| 2020/0351643 A1* | 11/2020 | Dhanapal | H04W 72/10 |
| 2021/0127414 A1* | 4/2021 | Abdoli | H03M 13/09 |
| 2021/0410011 A1* | 12/2021 | Hathiramani | H04W 76/16 |
| 2022/0141330 A1* | 5/2022 | Jia | H04L 5/0091 |
| | | | 370/252 |
| 2022/0225345 A1* | 7/2022 | Liu | H04L 41/0894 |
| 2022/0232440 A1* | 7/2022 | Dalsgaard | H04W 24/10 |

\* cited by examiner

330
Determine effective downlink bandwidth for carrier frequency associated with TDD configuration based on scaling factor 335
Scaling factor based on proportion of time allocated to downlink communication 365
Determine bandwidth metric based on carrier aggregation or dual connectivity configuration

370
Carrier aggregation
(sum bandwidths of all DL CCs)

| 40 MHz | 40 MHz |

FR1 FDD CCs = 2

375
ENDC
(sum bandwidths of all SCG DL CCs)

LTE PCell

| 20 MHz | 20 MHz |

FR1 SCG CCs = 2

380
NRDC FR1+FR1
(sum bandwidths of all MCG and SCG DL CCs)

| 40 MHz |

FR1 PCell of MCG

| 20 MHz | 20 MHz |

FR1 SCG CCs

385
NRDC FR1+FR2
(use FR2 bandwidth metric)

| 40 MHz |

FR1 PCell of MCG

| 100 MHz |

FR2 SCG

FIG. 3D

TECHNIQUES FOR DISPLAYING A RADIO ACCESS TECHNOLOGY STATUS INDICATION BASED ON BANDWIDTH METRICS

FIELD OF THE DISCLOSURE

Aspects of the present disclosure generally relate to wireless communication and to techniques and apparatuses for displaying a radio access technology (RAT) status indication based on bandwidth metrics.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. "Downlink" (or "forward link") refers to the communication link from the base station to the UE, and the "uplink" (or "reverse link") refers to the communication link from the UE to the base station. As will be described in more detail herein, a base station may be referred to as a Node B, a gNB, an access point (AP), a radio head, a transmit receive point (TRP), a New Radio (NR) base station, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining that the UE is connected to a wireless network on a first carrier frequency in a first frequency range that is associated with a lower data rate than a second carrier frequency in a second frequency range, wherein the first frequency range is associated with a first version of a radio access technology (RAT) and the second frequency range is associated with a second version of the RAT; determining a bandwidth metric associated with the first carrier frequency in the first frequency range; and displaying a first visual indicator associated with the first version of the RAT or a second visual indicator associated with the second version of the RAT based at least in part on the bandwidth metric.

In some aspects, the first visual indicator associated with the first version of the RAT is displayed based at least in part on the bandwidth metric failing to satisfy a threshold.

In some aspects, the second visual indicator associated with the second version of the RAT is displayed based at least in part on the bandwidth metric satisfying a threshold.

In some aspects, the bandwidth metric is a downlink bandwidth associated with the first carrier frequency based at least in part on the first carrier frequency having a frequency division duplexing (FDD) configuration.

In some aspects, the bandwidth metric is an effective downlink bandwidth associated with the first carrier frequency based at least in part on the first carrier frequency having a time division duplexing (TDD) configuration.

In some aspects, the effective downlink bandwidth is based at least in part on a total bandwidth associated with the first carrier frequency and a scaling factor that is based at least in part on a proportion of time resources that are allocated to downlink communication.

In some aspects, the effective downlink bandwidth is based at least in part on a total bandwidth associated with the first carrier frequency and a scaling factor having a configurable value stored in memory.

In some aspects, the method includes receiving, from the wireless network, one or more information elements (IEs) that indicate a downlink bandwidth associated with the first carrier frequency in a unit of resource blocks (RBs); and mapping the downlink bandwidth indicated in the one or more IEs to the bandwidth metric based at least in part on a subcarrier spacing (SCS) associated with the first carrier frequency.

In some aspects, the one or more IEs are received in a system information block (SIB) while the UE is camped on the wireless network.

In some aspects, mapping the value associated with the downlink bandwidth to the bandwidth metric includes: determining a maximum downlink bandwidth supported by the wireless network based at least in part on the downlink bandwidth indicated in the SIB, wherein the bandwidth metric is a highest downlink bandwidth supported by the UE that is less than or equal to the maximum downlink bandwidth supported by the wireless network.

In some aspects, mapping the value associated with the downlink bandwidth to the bandwidth metric includes: determining, based at least in part on past connected mode history information, a maximum downlink bandwidth configured for the UE in a cell associated with the SIB, wherein the bandwidth metric is the maximum downlink bandwidth configured for the UE in the cell associated with the SIB.

In some aspects, the one or more IEs are received in a radio resource control (RRC) message while the UE is in a connected mode on the wireless network.

In some aspects, the bandwidth metric is a sum of bandwidth values of all downlink component carriers in a primary cell (PCell) and one or more secondary cells (SCells) based at least in part on a carrier aggregation configuration associated with the UE.

In some aspects, the bandwidth metric is a sum of bandwidth values of all downlink component carriers in a secondary cell group (SCG) based at least in part on a dual connectivity configuration associated with the UE.

In some aspects, the bandwidth metric is a sum of bandwidth values of all downlink component carriers in a master cell group (MCG) and an SCG based at least in part on a dual connectivity configuration associated with the UE.

In some aspects, the second visual indicator associated with the second version of the RAT is displayed based at least in part on a carrier aggregation or dual connectivity configuration associated with the UE including one or more component carriers in the second frequency range.

In some aspects, the RAT is a 5G or New Radio (NR) RAT.

In some aspects, the first carrier frequency is in a sub-6 gigahertz (GHz) band and the second carrier frequency is in a millimeter wave (mmW) band.

In some aspects, a UE for wireless communication includes a memory and one or more processors, coupled to the memory, configured to: determine that the UE is connected to a wireless network on a first carrier frequency in a first frequency range that is associated with a lower data rate than a second carrier frequency in a second frequency range, wherein the first frequency range is associated with a first version of a RAT and the second frequency range is associated with a second version of the RAT; determine a bandwidth metric associated with the first carrier frequency in the first frequency range; and display a first visual indicator associated with the first version of the RAT or a second visual indicator associated with the second version of the RAT based at least in part on the bandwidth metric.

In some aspects, the first visual indicator associated with the first version of the RAT is displayed based at least in part on the bandwidth metric failing to satisfy a threshold.

In some aspects, the second visual indicator associated with the second version of the RAT is displayed based at least in part on the bandwidth metric satisfying a threshold.

In some aspects, the bandwidth metric is a downlink bandwidth associated with the first carrier frequency based at least in part on the first carrier frequency having an FDD configuration.

In some aspects, the bandwidth metric is an effective downlink bandwidth associated with the first carrier frequency based at least in part on the first carrier frequency having a TDD configuration.

In some aspects, the effective downlink bandwidth is based at least in part on a total bandwidth associated with the first carrier frequency and a scaling factor that is based at least in part on a proportion of time resources that are allocated to downlink communication.

In some aspects, the effective downlink bandwidth is based at least in part on a total bandwidth associated with the first carrier frequency and a scaling factor having a configurable value stored in memory.

In some aspects, the one or more processors are further configured to: receive, from the wireless network, one or more IEs that indicate a downlink bandwidth associated with the first carrier frequency in a unit of RBs; and map the downlink bandwidth indicated in the one or more IEs to the bandwidth metric based at least in part on an SCS associated with the first carrier frequency.

In some aspects, the one or more IEs are received in a SIB while the UE is camped on the wireless network.

In some aspects, the one or more processors, to map the value associated with the downlink bandwidth to the bandwidth metric, are configured to: determine a maximum downlink bandwidth supported by the wireless network based at least in part on the downlink bandwidth indicated in the SIB, wherein the bandwidth metric is a highest downlink bandwidth supported by the UE that is less than or equal to the maximum downlink bandwidth supported by the wireless network.

In some aspects, the one or more processors, to map the value associated with the downlink bandwidth to the bandwidth metric, are configured to: determine, based at least in part on past connected mode history information, a maximum downlink bandwidth configured for the UE in a cell associated with the SIB, wherein the bandwidth metric is the maximum downlink bandwidth configured for the UE in the cell associated with the SIB.

In some aspects, the one or more IEs are received in an RRC message while the UE is in a connected mode on the wireless network.

In some aspects, the bandwidth metric is a sum of bandwidth values of all downlink component carriers in a PCell and one or more SCells based at least in part on a carrier aggregation configuration associated with the UE.

In some aspects, the bandwidth metric is a sum of bandwidth values of all downlink component carriers in an SCG based at least in part on a dual connectivity configuration associated with the UE.

In some aspects, the bandwidth metric is a sum of bandwidth values of all downlink component carriers in an MCG and an SCG based at least in part on a dual connectivity configuration associated with the UE.

In some aspects, the second visual indicator associated with the second version of the RAT is displayed based at least in part on a carrier aggregation or dual connectivity configuration associated with the ULE including one or more component carriers in the second frequency range.

In some aspects, the RAT is a 5G or NR RAT.

In some aspects, the first carrier frequency is in a sub-6 GHz band and the second carrier frequency is in a mmW band.

In some aspects, a non-transitory computer-readable medium storing a set of instructions for wireless communication includes one or more instructions that, when executed by one or more processors of a UE, cause the UE to: determine that the UE is connected to a wireless network on a first carrier frequency in a first frequency range that is associated with a lower data rate than a second carrier frequency in a second frequency range, wherein the first frequency range is associated with a first version of a RAT and the second frequency range is associated with a second version of the RAT; determine a bandwidth metric associated with the first carrier frequency in the first frequency range; and display a first visual indicator associated with the first version of the RAT or a second visual indicator associated with the second version of the RAT based at least in part on the bandwidth metric.

In some aspects, an apparatus for wireless communication includes means for determining that the apparatus is connected to a wireless network on a first carrier frequency in a first frequency range that is associated with a lower data rate than a second carrier frequency in a second frequency range, wherein the first frequency range is associated with a first version of a RAT and the second frequency range is associated with a second version of the RAT; means for determining a bandwidth metric associated with the first carrier frequency in the first frequency range; and means for displaying a first visual indicator associated with the first version of the RAT or a second visual indicator associated with the second version of the RAT based at least in part on the bandwidth metric.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3D are diagrams illustrating examples associated with displaying a radio access technology (RAT) status indication based on bandwidth metrics, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
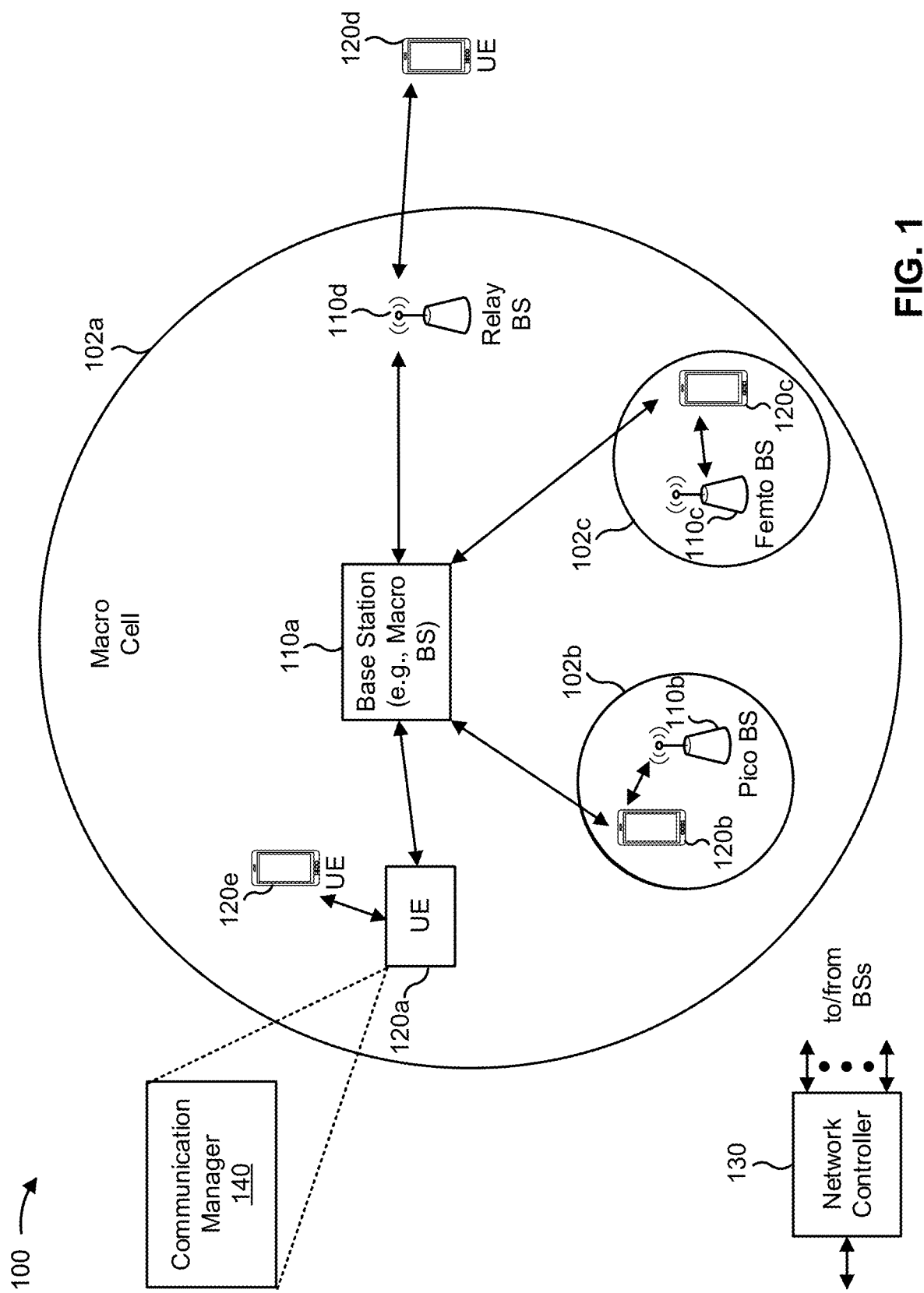
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR base station, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR base station", "gNB", "TRP", "AP", "node B", "5G NB", and "cell" may be used interchangeably herein.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may determine that the UE 120 is connected to a wireless network on a first carrier frequency in a first frequency range that is associated with a lower data rate than a second carrier frequency in a second frequency range, wherein the first frequency range is associated with a first version of a RAT and the second frequency range is associated with a second version of the RAT; determine a bandwidth metric associated with the first carrier frequency in the first frequency range; and display a first visual indicator associated with the first version of the RAT or a second visual indicator associated with the second version of the RAT based at least in part on the bandwidth metric. Additionally, or alternatively, the communication manager 140 may perform one or more other operations described herein.

As indicated above, FIG. 1 is provided as an example. Other examples may differ from what is described with regard to FIG. 1.

Figure 2:
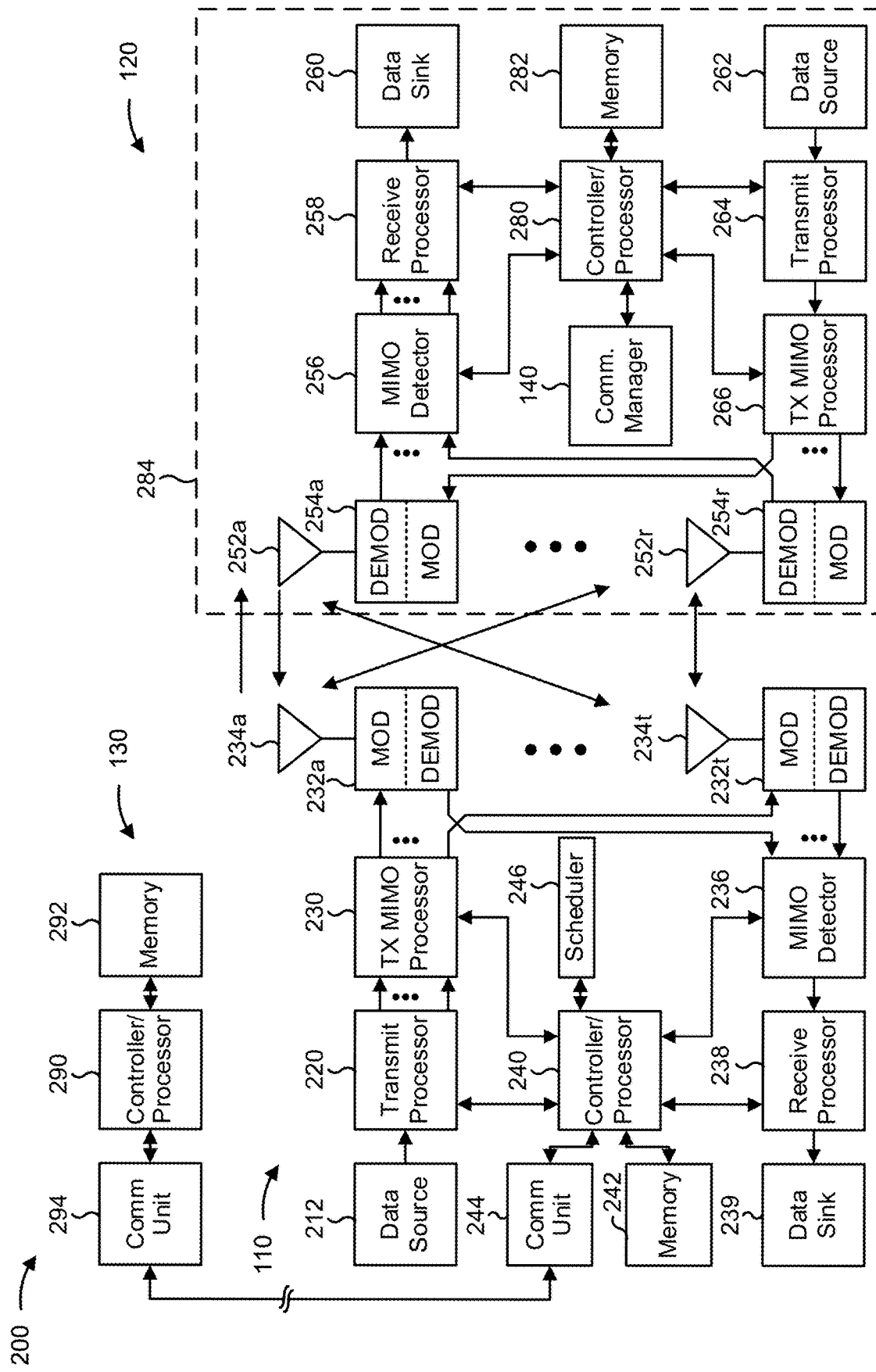
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., as described with reference to FIGS. 3A-3D and/or FIG. 4).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., as described with reference to FIGS. 3A-3D and/or FIG. 4).

Controller/processor 240 of base station 110, controller/processor 280 of UE 120, and/or any other component(s) of FIG. 2 may perform one or more techniques associated with displaying a RAT status indication based on bandwidth metrics, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4 and/or other processes as described herein. In some aspects, executing instructions may include running the instructions, converting the instructions, compiling the instructions, and/or interpreting the instructions.

In some aspects, the UE 120 includes means for determining that the UE 120 is connected to a wireless network on a first carrier frequency in a first frequency range that is associated with a lower data rate than a second carrier frequency in a second frequency range, wherein the first frequency range is associated with a first version of a RAT and the second frequency range is associated with a second version of the RAT; means for determining a bandwidth metric associated with the first carrier frequency in the first frequency range; and/or means for displaying a first visual indicator associated with the first version of the RAT or a second visual indicator associated with the second version of the RAT based at least in part on the bandwidth metric. The means for the UE 12 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

As described above, a wireless network deployed in a given geographic area may support one or more RATs and may operate on one or more frequencies. Furthermore, in some cases, a wireless network may support different versions of a RAT in order to serve UEs that have different capabilities and/or to offer different service capabilities. For example, in a wireless network that supports an NR RAT (often referred to as 5G), a UE may connect to the wireless network on a carrier frequency in a first frequency range (FR1) that spans from 410 MHz to 7.125 GHz (often referred to as a "sub-6 GHz" band) and/or a carrier frequency in a second frequency range (FR2) that spans from 24.25 GHz to 52.6 GHz (often referred to as a "millimeter wave" (mmW) band). In general, communication at higher carrier frequencies (e.g., in FR2 and/or other mmW bands, such as frequency range 4 (FR4) that spans from 52.6 GHz to 114.25 GHz) may be associated with much higher data rates than communication at lower carrier frequencies (e.g., in FR1). However, because mmW communications have very short wavelengths, mmW communications tend to have shorter propagation distances and are more subject to atmospheric attenuation and blockage by obstructions. Accordingly, a wireless network that enables communication in mmW bands may also enable communication in sub-6 GHz bands to provide a larger coverage area and/or more reliable service, among other examples.

Because communications in different frequency ranges (e.g., FR1 versus FR2) may offer significantly different user experiences, the different frequency ranges that a particular RAT supports may be associated with different RAT versions. For example, in an NR network, carrier frequencies in FR1 may be associated with a first version of the NR RAT (e.g., a baseline version, a low-band version, or a basic version), and carrier frequencies in FR2 that offer much faster data rates than carrier frequencies in FR1 may be associated with a second version of the NR RAT (e.g., an advanced version or a high-band version). In general, because a UE switches between carrier frequencies in different frequency ranges automatically (e.g., in a region where both frequency ranges are available, and the UE has a capability to communicate using carrier frequencies in either or both frequency ranges), a visual indicator (e.g., an icon) that a UE displays to indicate which version of the RAT is currently active is typically based on a carrier frequency. For example, a UE may display a 5G icon or other visual indicator when the UE is connected to an NR network on an FR1 carrier frequency, or the UE may display an advanced icon or visual indicator (e.g., 5G+ when the UE is connected to an NR network on an FR2 carrier frequency. However, in some cases, carrier frequencies in FR1 may offer comparable data rates to carrier frequencies in FR2. In such cases, displaying the baseline 5G icon may be misleading to the user, which may lead to the user refraining from utilizing services that depend on high data rates (e.g., gaming or streaming).

Some aspects described herein relate to techniques and apparatuses to display a RAT status indication on a UE based on bandwidth metrics. For example, when a UE is connected to a wireless network on a carrier frequency in a first frequency range (e.g., FR1) that is associated with a lower data rate than a carrier frequency in a second frequency range (e.g., FR2), the UE may determine whether to display an icon or visual indicator associated with a first (e.g., baseline) version of a RAT or a second (e.g., advanced) version of the RAT based on a bandwidth metric associated with the carrier frequency in the first frequency range. For example, the UE may display a first icon that is associated with the first version of the RAT (e.g., a basic icon such as "5G" that is associated with carrier frequencies in FR1) when the bandwidth metric fails to satisfy a threshold, or the UE may display a second icon that is associated with the second version of the RAT (e.g., an advanced icon such as "5G+" that is associated with carrier frequencies in FR2) when the bandwidth metric satisfies the threshold. In this way, rather than merely reflecting the carrier frequency that the UE is using to communicate on the wireless network, the icon or visual indicator that is displayed on the UE may convey the data rate that the user can expect to experience when communicating on the wireless network. In this way, when the UE is connected to the wireless network on a carrier frequency associated with a bandwidth metric that satisfies the threshold, the user may be provided with a visual indicator to indicate that network conditions are suitable to engage with services that depend on a high data rate.

FIGS. 3A-3D are diagrams illustrating examples 300 associated with displaying a RAT status indication based on bandwidth metrics, in accordance with the present disclosure. As shown in FIGS. 3A-3D, examples 300 include communication between a UE (e.g., UE 120) and one or more nodes (e.g., TRPs and/or base stations) in a wireless network (e.g., wireless network 100). In some aspects, the UE 120 may communicate with the one or more nodes in the wireless network via a wireless access link, which may include an uplink and a downlink.

In some aspects, the wireless network may support communication in different frequency ranges, which may be associated with different versions of a RAT. For example, as described herein, the wireless network may support communication using carrier frequencies in FR1, which is associated with a first version (e.g., a baseline version) of an NR RAT, and the wireless network may further support communication using carrier frequencies in FR2, which is associated with a second version (e.g., an advanced version) of the NR RAT. However, it will be appreciated that some aspects described herein may apply to other frequency ranges (e.g., FR4) and/or other RATs, such as a 3G RAT, a 4G RAT, and/or a RAT subsequent to 5G (e.g., 6G).

Figure 3A:
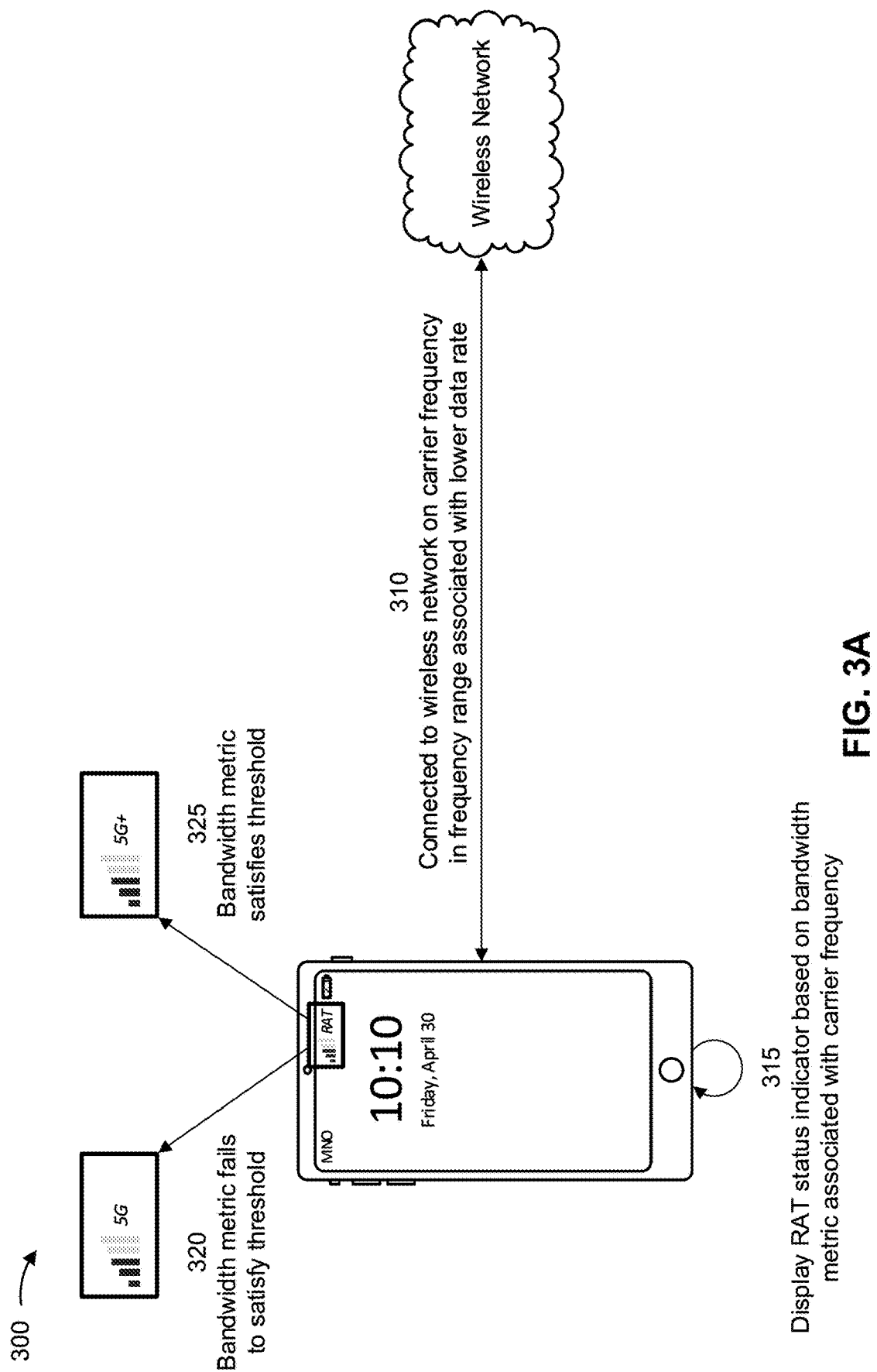

As shown in FIG. 3A, and by reference number 310, the UE may be connected to the wireless network on a carrier frequency in a first frequency range that is associated with a lower data rate than a carrier frequency in a second frequency range. For example, the carrier frequency in the first frequency range may be included in a sub-6 GHz band in FR1, which is generally associated with a lower data rate than a carrier frequency included in a mmW band in FR2. However, in some cases, the carrier frequency in the first frequency range may offer a comparable data rate to a carrier frequency in the second frequency range (e.g., the carrier frequency in the first frequency range is not necessarily associated with a slower transmission speed). For example, in some aspects, the carrier frequency in the first frequency range may offer a comparable data rate to the second frequency range due to having a large bandwidth, a carrier aggregation configuration that combines multiple component carriers to offer a higher data rate, and/or a dual connectivity configuration that enables the UE to simultaneously communicate using different RATs and/or different cell groups.

Accordingly, as further shown in FIG. 3A, and by reference number 315, the UE may display a RAT status indicator based at least in part on a bandwidth metric associated with the carrier frequency in the first frequency range, which may be referred to herein as an FR1 carrier frequency. For example, as will be described in further detail below, the UE may determine the bandwidth metric associated with the FR1 carrier frequency based at least in part on a downlink bandwidth associated with the FR1 carrier frequency (e.g., a frequency division duplexing (FDD) or time division duplexing (TDD) configuration), one or more information elements (IEs) that are received from the wireless network to signal a downlink bandwidth associated with the FR1 carrier frequency, channel bandwidths that are supported by the UE, a past connected mode history that indicates configured bandwidths associated with one or more cells in the wireless network, and/or bandwidths associated with one or more component carriers in a carrier aggregation or dual connectivity configuration.

In some aspects, as shown by reference number 320, the UE may display a first visual indicator associated with the first version of the RAT (e.g., a 5G icon) based at least in part on the bandwidth metric associated with the FR1 carrier frequency failing to satisfy a threshold (e.g., when the bandwidth metric for the FR1 carrier frequency is less than the threshold, or less than or equal to the threshold). Alternatively, as shown by reference number 325, the UE may display a second visual indicator associated with the second version of the RAT (e.g., a 5G+, or other suitable icon) based at least in part on the bandwidth metric associated with the FR1 carrier frequency satisfying the threshold (e.g., when the bandwidth metric for the FR1 carrier frequency exceeds the threshold, or equals or exceeds the threshold). For example, as described herein, the threshold may have a configurable value at which the FR1 carrier frequency may offer a comparable data rate as a carrier frequency in a second (higher) frequency range, which may be referred to herein as an FR2 carrier frequency. In this way, when the bandwidth metric associated with the FR1 carrier frequency satisfies the threshold, the UE may display the second visual indicator associated with an advanced or high data rate version of the RAT, which is typically displayed only when the UE is connected to the wireless network on an FR2 carrier frequency. In this way, the RAT status indicator that is shown on the UE may indicate whether the user can expect to experience a relatively higher or lower date rate such that the user can make a better informed decision regarding which services to utilize and/or refrain from utilizing.

In some aspects, as described above, the UE may use one or more techniques to determine the bandwidth metric that is compared to the threshold to determine whether to display the first visual indicator associated with the first (e.g., baseline or low data rate) version of the RAT or the second visual indicator associated with the second (e.g., advanced or high data rate) version of the RAT. In general, as described herein, the bandwidth metric may be based at least in part on a downlink bandwidth associated with the FR1 carrier frequency (e.g., because downlink data rates are typically more important from a user experience perspective). For example, in cases where the FR1 carrier frequency is associated with an FDD configuration (e.g., where separate paired frequencies are used for uplink transmission and downlink reception, respectively), the bandwidth metric for the FR1 carrier frequency may be a downlink bandwidth associated with the FR1 carrier frequency.

Figure 3B:
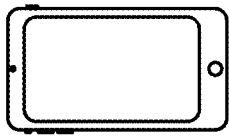
Figure 3B:
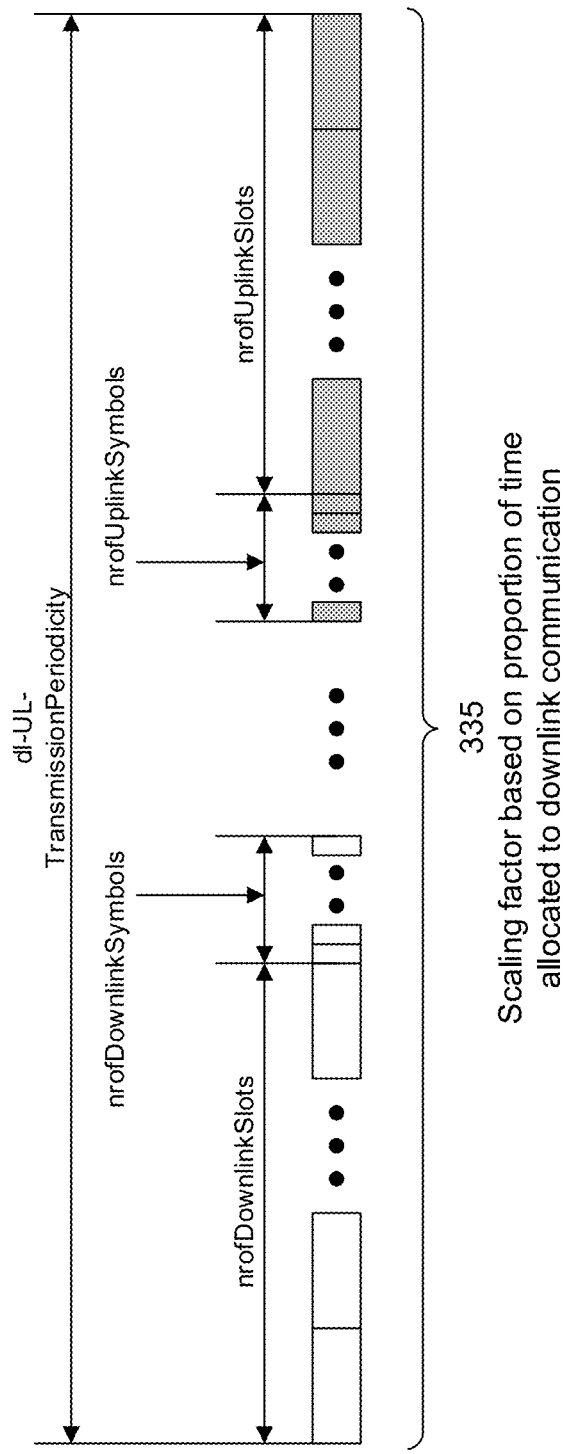

Alternatively, as shown in FIG. 3B, and by reference number 330, the bandwidth metric may be an effective downlink bandwidth in cases where the FR1 carrier frequency is associated with a TDD configuration (e.g., where uplink transmission and downlink reception are performed at the same frequency at different times). For example, in some aspects, the UE may determine the effective downlink bandwidth for an FR1 carrier frequency having a TDD configuration by multiplying a total bandwidth of the FR1 carrier frequency by a scaling factor. For example, because the total bandwidth is shared between the downlink and the uplink in a TDD configuration, the scaling factor may have a value in a range from 0 to 1 in order to discount the total bandwidth by an amount of time that is used for uplink transmission. In some aspects, the scaling factor that is multiplied by the total bandwidth of the FR1 carrier frequency may have a configurable value that is stored in a memory of the UE. For example, in some aspects, the scaling factor may have a configurable value of 0.5 or another suitable value to represent the proportion of time resources expected to be allocated to downlink communication. In one example, if the total bandwidth of the FR1 carrier frequency is 60 MHz and the threshold is 50 MHz, the UE may display the basic 5G icon based on the scaling factor of 0.5 resulting in an effective downlink bandwidth of 30 MHz. However, it will be appreciated that other suitable values may be used for the threshold and/or the configurable value of the scaling factor stored in the memory of the UE. In some aspects, the scaling factor may be used to compare a bandwidth associated with a first FR1 carrier frequency having an FDD configuration and a bandwidth associated with a second FR1 carrier frequency having a TDD configuration. Additionally, or alternatively, the UE may apply a configurable scaling factor having a value greater than or equal to one to an FR1 carrier frequency having an FDD configuration. For example, in some aspects, the downlink channel bandwidth of an FR1 carrier frequency having an FDD configuration may be multiplied by the scaling factor to reflect that an FDD configuration has separate downlink and uplink bandwidths, whereas a TDD bandwidth is shared for downlink and uplink communication.

In some aspects, rather than relying on the configurable value of the scaling factor, which may not accurately represent the proportion of time resources allocated to downlink communication, the UE may determine the scaling factor based on the TDD configuration associated with the FR1 carrier frequency. For example, as shown by reference number 335, the scaling factor may be based on a proportion of time allocated to downlink communication, which may be determined based on a TDD configuration that the wireless network indicates to the UE as a downlink-uplink pattern having a certain periodicity (shown as dl-UL-TransmissionPeriodicity), which may have a duration of 0.5 milliseconds (ms), 0.625 ms, 1.25 ms, 2.5 ms, 5 ms, or 10 ms. Furthermore, the downlink-uplink pattern may be associated with a parameter (e.g., nrofDownlinkSlots) that indicates a number of consecutive full downlink slots at the start of each downlink-uplink pattern, a parameter (e.g., nrofDownlinkSymbols) that indicates a number of consecutive downlink symbols that follow the last full downlink slot, a parameter (e.g., nrofUplinkSlots) that indicates a number of consecutive full uplink slots at the end of each downlink-uplink pattern, and a parameter (e.g., nrofUplinkSymbols) that indicates a number of consecutive uplink symbols that precede the first full uplink slot. Accordingly, the UE can use the various parameters associated with the TDD configuration to compute the proportion of time resources allocated to downlink communication, which may be used as the scaling factor.

For example, in an NR network, a one (1) ms duration may generally include one (1) slot at a subcarrier spacing (SCS) of 15 kilohertz (kHz), two (2) slots at an SCS of 30 kHz SCS, four (4) slots at an SCS of 60 kHz, and the number of slots in a 1 ms duration may scale proportionately to higher SCS values. Furthermore, one slot typically has fourteen (14) symbols, whereby the nrofDownlinkSlots parameter may indicate the number of full downlink slots in one downlink-uplink transmission period, and the nrofDownlinkSymbols parameter may be divided by 14 to determine a fraction of a slot occupied by the number of consecutive downlink symbols that follow the last full downlink slot. Accordingly, the UE may determine the total number of slots in one downlink-uplink transmission period based on the dl-UL-TransmissionPeriodicity parameter and the SCS associated with the FR1 carrier frequency, and the UE may further determine the total number of downlink slots in one downlink-uplink transmission period based on the nrofDownlinkSlots and the nrofDownlinkSymbols parameters. In this way, the scaling factor may be determined by the expression (nrofDownlinkSlots+(nrofDownlinkSymbols/X))/Y, where X is the number of symbols in one slot, and Y is the number of slots in one period defined by the dl-UL-TransmissionPeriodicity parameter and the SCS.

For example, if the nrofDownlinkSlots parameter has a value of seven (7), the nrofDownlinkSymbols parameter has a value of seven (7), and one slot has fourteen (14) symbols, the total number of downlink slots in one downlink-uplink transmission period is 7+7/14=7.5. Further, if the dl-UL-TransmissionPeriodicity parameter indicates a 5 ms duration for an FR1 carrier frequency having an SCS of 30 kHz, one downlink-uplink transmission period may have a total of ten (10) slots. In this example, the scaling factor may be 7+7/14 divided by 10, or 0.75. Accordingly, in an example where the total bandwidth of the FR1 carrier frequency is 60 MHz and the threshold compared to the bandwidth metric is 60 MHz, the UE may display the basic visual indicator based on an effective total bandwidth of 0.75*60 MHz=45 MHz, which fails to satisfy the threshold. However, if the total bandwidth of the FR1 carrier frequency is 100 MHz and the same 60 MHz threshold is used, the UE may display the advanced visual indicator based on the FR1 carrier frequency having an effective total bandwidth of 0.75*100 MHz=75 MHz, which satisfies the threshold.

Figure 3C:
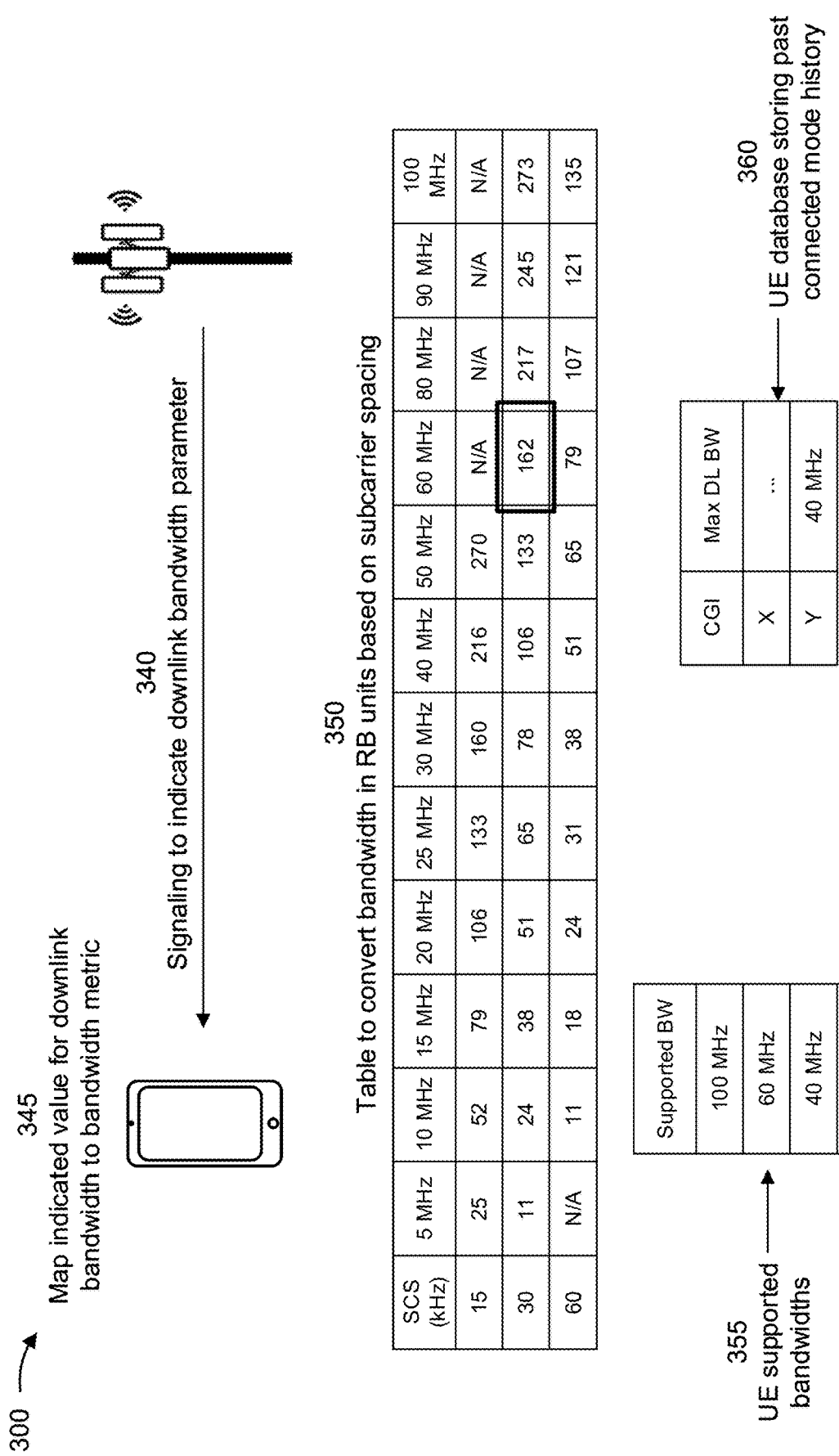

Additionally, or alternatively, in some aspects, the UE may determine the bandwidth metric to compare to the threshold based at least in part on one or more IEs that are received from the wireless network. For example, as shown in FIG. 3C, and by reference number 340, the UE may receive signaling that includes one or more IEs to indicate a downlink bandwidth parameter. For example, when the UE is camped on the wireless network, a downlink bandwidth may be indicated in a system information block (SIB) (e.g., NR SIB1) using a carrierbandwidth IE. Additionally, or alternatively, when the UE is in connected mode in an NR standalone mode, an Evolved Universal Mobile Telecommunications System Terrestrial Radio Access (E-UTRA)-NR dual connectivity (ENDC) modem and/or an NR dual connectivity (NRDC) mode, the downlink bandwidth may be indicated using a downlinkChannelBW-PerSCS-List IE carried in a radio resource control (RRC) message (e.g., an RRCReconfiguration message). In general, the carrierbandwidth and downlinkChannelBW-PerSCS-List IEs may indicate the downlink bandwidth for the FR1 carrier frequency in a unit of resource blocks (RBs). Accordingly, as shown by reference number 345, the UE may map the value of the downlink bandwidth that is indicated in the one or more IEs to the bandwidth metric for the FR1 carrier frequency.

For example, as shown by reference number 350, the UE may store a lookup table to convert the downlink bandwidth from the unit of RBs to the bandwidth metric based on the SCS of the FR1 carrier frequency. Accordingly, the UE may determine a row in the lookup table that corresponds to the SCS of the FR1 carrier frequency, and may then locate the value of the downlink bandwidth that is indicated in the one or more IEs within the row that corresponds to the SCS of the FR1 carrier frequency in order to convert the downlink bandwidth from the unit of RBs to the bandwidth metric. For example, if the carrierbandwidth IE and/or the downlinkChannelBW-PerSCS-List IE indicates a downlink bandwidth of 162 RBs for an FR1 carrier frequency having an SCS of 30 kHz, the UE may determine that the bandwidth metric for the FR1 carrier frequency is 60 MHz. In this case, the visual indicator displayed on the UE may correspond to the advanced or high data rate icon based on the bandwidth metric satisfying (e.g., equaling) a threshold of 60 MHz. In another example, if the carrierbandwidth IE and/or the downlinkChannelBW-PerSCS-List IE indicates a downlink bandwidth of 270 RBs for an FR1 carrier frequency having an SCS of 15 kHz, the UE may map the indicated value of the downlink bandwidth to a bandwidth metric of 50 MHz, in which case the visual indicator displayed on the UE may correspond to the basic or low data rate icon based on the bandwidth metric failing to satisfy (e.g., equal or exceed) the threshold of 60 MHz.

In general, the downlink bandwidth that is indicated in the carrierbandwidth IE may correspond to the maximum downlink bandwidth that can be supported in a current NR cell. However, in some cases, the UE may or may not support the maximum downlink bandwidth indicated in the carrierbandwidth IE. For example, as shown by reference number 355, the UE may have capabilities to support a set of channel bandwidths, which includes {100 MHz, 60 MHz, 40 MHz, and 20 MHz} in the example shown in FIG. 3C. Accordingly, in order to map the downlink bandwidth that is indicated in the carrierbandwidth IE to the bandwidth metric for the FR1 carrier frequency, the UE may determine the maximum downlink bandwidth that corresponds to the downlink bandwidth that is indicated in the carrierbandwidth IE, and the bandwidth metric may be a maximum downlink bandwidth supported by the UE that is less than or equal to the maximum downlink bandwidth supported by the current cell. For example, if the carrierbandwidth IE indicates a maximum downlink bandwidth of 70 MHz and the set of channel bandwidths supported by the UE includes {100 MHz, 60 MHz, 40 MHz, and 20 MHz}, the bandwidth metric may be 60 MHz (the largest value in the set that is less than or equal to the maximum downlink bandwidth of 70 MHz). In this example, the UE may display the advanced or high data rate icon based on a threshold of 60 MHz (or lower) or may display the basic or low data rate icon based on a threshold higher than 60 MHz.

In some aspects, the techniques described above can generally be used to determine the maximum downlink bandwidth that the UE supports, given the maximum downlink bandwidth supported by the current cell. However, in some cases, the wireless network may be unable to guarantee a bandwidth that meets the maximum downlink bandwidth supported by the UE. Accordingly, in some aspects, the UE may use a past connected mode history for the current cell in order to determine the bandwidth metric. For example, as shown by reference number 360, the UE may maintain a database that stores a past connected mode history for different cells in the wireless network, each of which may be represented in the database by a cell global identity (CGI) that is based on a public land mobile network (PLMN) identity and a cell identity. Accordingly, when the UE is in connected mode in a particular cell, the UE may receive an RRC message (e.g., an RRCReconfiguration message) that carries a downlinkChannelBW-PerSCS IE to indicate a downlink channel bandwidth that is configured for the UE while the UE is in connected mode.

In some aspects, the UE may store a maximum configured downlink channel bandwidth for each cell in the database while UE is in connected mode, which may be used as the bandwidth metric in idle or inactive mode. For example, if the database of past connected mode history indicates that 40 MHz is the maximum bandwidth that has been configured for the UE in the current cell, the UE may determine that the 40 MHz maximum bandwidth is applicable in idle or inactive mode and may display the basic or low data rate icon based on the 40 MHz maximum bandwidth failing to satisfy a 60 MHz threshold. However, if the UE enters connected mode on the current cell and the downlinkChannelBW-PerSCS IE configures a larger downlink channel bandwidth of 60 MHz, the UE may update the entry in the database of past connected mode history. In this case, if the UE enters idle or inactive mode on the current cell at a later time, the UE may display the advanced or high data rate icon based on the maximum configured bandwidth of 60 MHz satisfying the 60 MHz threshold.

Additionally, or alternatively, as shown in FIG. 3D, and by reference number 365, the UE may determine the bandwidth metric to compare to the threshold based at least in part on a carrier aggregation or dual connectivity configuration associated with the UE. For example, as shown by reference number 370, the UE may be associated with a carrier aggregation configuration in which multiple FR1 component carriers are configured for the UE. In such cases, when the UE has a carrier aggregation configuration, the UE may determine the bandwidth metric by summing the bandwidth values of all downlink component carriers, including all downlink component carriers in a primary cell (PCell) and all downlink component carriers in one or more secondary cells (SCells). For example, reference number 370 depicts an example where the UE is operating in an NR standalone carrier aggregation configuration with two (2) FR1 component carriers that are associated with an FDD configuration and respective downlink bandwidths of 40 MHz per component carrier. In this example, the aggregated bandwidths of all downlink component carriers is 80 MHz, which may result in the UE displaying the advanced or high data rate icon based on the bandwidth metric of 80 MHz satisfying a threshold of 60 MHz. Furthermore, it will be appreciated that other techniques described above may be used to determine the bandwidth metric for each downlink component carrier (e.g., where the downlink component carriers have a TDD configuration and/or one or more IEs are used to indicate the downlink bandwidth).

In another example, as shown by reference number 375, the UE may be associated with an ENDC configuration, where the UE communicates using a 4G or LTE RAT on an LTE PCell or master cell group (MCG) and further communicates using an NR RAT on a secondary cell group (SCG). In such cases, when the UE has an ENDC configuration where the SCG associated with the NR RAT includes one or more FR1 component carriers, the UE may determine the bandwidth metric by summing the bandwidth values of all downlink component carriers in the SCG, including all downlink component carriers in a primary secondary cell (PSCell) and any SCells. For example, reference number 375 depicts an example where the UE is operating in an ENDC configuration with two (2) FR1 component carriers in the SCG, each of which are associated with a bandwidth metric of 20 MHz (e.g., based on an FDD or TDD configuration, downlink bandwidths indicated in one or more IEs, a set of bandwidth values supported by the UE, or a past connected mode history, among other examples). In this example, the aggregated bandwidths of all downlink component carriers in the SCG is 40 MHz, which may result in the UE displaying the basic or low data rate icon based on the bandwidth metric of 40 MHz failing to satisfy the threshold of 60 MHz.

In another example, as shown by reference number 380, the UE may be associated with an NRDC configuration, where the MCG and the SCG are each associated with a 5G or NR RAT. In such cases, when the UE has an FR1+FR1 NRDC configuration (e.g., where the component carriers in the MCG and the SCG are all FR1 carrier frequencies), the UE may determine the bandwidth metric by summing the bandwidth values of all downlink component carriers in the MCG and the SCG, including all downlink component carriers in a PCell in the MCG, any SCells in the MCG, a PSCell in the SCG, and any SCells in the SCG. For example, reference number 380 depicts an example where the UE is operating in an NRDC configuration where a PCell in the MCG is configured on an FR1 carrier frequency with a bandwidth metric of 40 MHz, which alone may fail to satisfy a threshold of 60 MHz. However, as further shown, the SCG includes two (2) FR1 component carriers, each of which are associated with a bandwidth metric of 20 MHz. In this example, the aggregated bandwidths of all downlink component carriers in the MCG and the SCG is 80 MHz, which may result in the UE displaying the advanced or high data rate icon based on the aggregated bandwidth metric of 80 MHz satisfying the threshold of 60 MHz.

In another example, as shown by reference number 385, the UE may be associated with an FR1+FR2 NRDC configuration, where the component carriers in the MCG include FR1 carrier frequencies and the component carriers in the SCG include FR2 carrier frequencies associated with higher data rates. In this case, because the FR2 carrier frequencies are associated with mmW bands that offer higher data rates, the UE may display the advanced or high data rate icon based on the large bandwidths associated with FR2 carrier frequencies.

As indicated above, FIGS. 3A-3D are provided as examples. Other examples may differ from what is described with regard to FIGS. 3A-3D.

Figure 4:
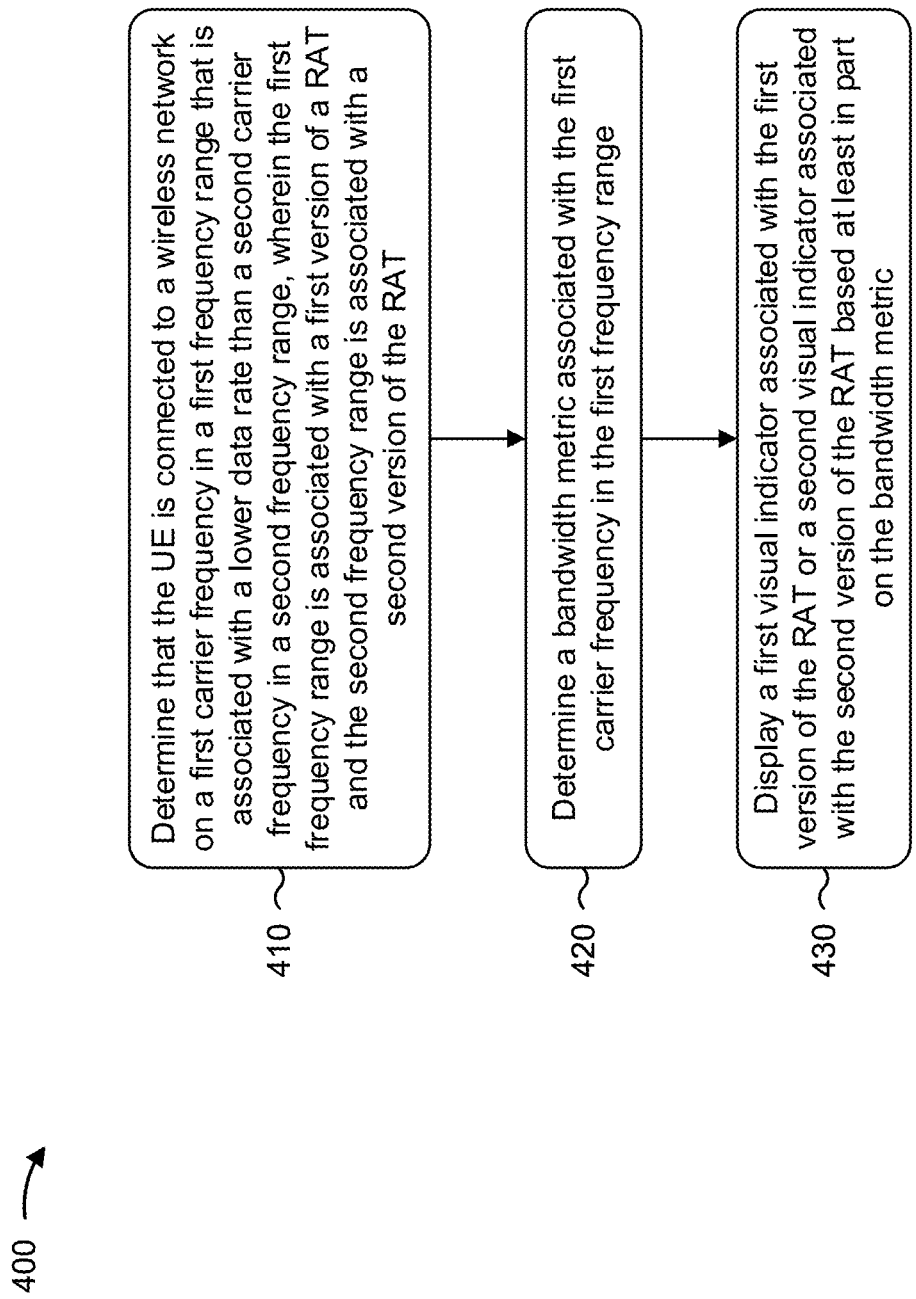
FIG. 4 is a diagram illustrating an example process associated with displaying a RAT status indication based on bandwidth metrics, in accordance with the present disclosure.

FIG. 4 is a diagram illustrating an example process 400 performed, for example, by a UE, in accordance with the present disclosure. Example process 400 is an example where the UE (e.g., UE 120) performs operations associated with techniques for displaying a RAT status indication based on bandwidth metrics.

As shown in FIG. 4, in some aspects, process 400 may include determining that the UE is connected to a wireless network on a first carrier frequency in a first frequency range that is associated with a lower data rate than a second carrier frequency in a second frequency range, wherein the first frequency range is associated with a first version of a RAT and the second frequency range is associated with a second version of the RAT (block 410). For example, the UE (e.g., using communication manager 140 and/or determination component 508, depicted in FIG. 5) may determine that the UE is connected to a wireless network on a first carrier frequency in a first frequency range that is associated with a lower data rate than a second carrier frequency in a second frequency range, wherein the first frequency range is associated with a first version of a RAT and the second frequency range is associated with a second version of the RAT, as described above.

As further shown in FIG. 4, in some aspects, process 400 may include determining a bandwidth metric associated with the first carrier frequency in the first frequency range (block 420). For example, the UE (e.g., using communication manager 140 and/or determination component 508, depicted in FIG. 5) may determine a bandwidth metric associated with the first carrier frequency in the first frequency range, as described above.

As further shown in FIG. 4, in some aspects, process 400 may include displaying a first visual indicator associated with the first version of the RAT or a second visual indicator associated with the second version of the RAT based at least in part on the bandwidth metric (block 430). For example, the UE (e.g., using communication manager 140 and/or display component 510, depicted in FIG. 5) may display a first visual indicator associated with the first version of the RAT or a second visual indicator associated with the second version of the RAT based at least in part on the bandwidth metric, as described above.

Process 400 may include additional aspects, such as any single aspect or any combination of aspects described below and/or in connection with one or more other processes described elsewhere herein.

In a first aspect, the first visual indicator associated with the first version of the RAT is displayed based at least in part on the bandwidth metric failing to satisfy a threshold.

In a second aspect, alone or in combination with the first aspect, the second visual indicator associated with the second version of the RAT is displayed based at least in part on the bandwidth metric satisfying a threshold.

In a third aspect, alone or in combination with one or more of the first and second aspects, the bandwidth metric is a downlink bandwidth associated with the first carrier frequency based at least in part on the first carrier frequency having an FDD configuration.

In a fourth aspect, alone or in combination with one or more of the first through third aspects, the bandwidth metric is an effective downlink bandwidth associated with the first carrier frequency based at least in part on the first carrier frequency having a TDD configuration.

In a fifth aspect, alone or in combination with one or more of the first through fourth aspects, the effective downlink bandwidth is based at least in part on a total bandwidth associated with the first carrier frequency and a scaling factor that is based at least in part on a proportion of time resources that are allocated to downlink communication.

In a sixth aspect, alone or in combination with one or more of the first through fifth aspects, the effective downlink bandwidth is based at least in part on a total bandwidth associated with the first carrier frequency and a scaling factor having a configurable value stored in memory.

In a seventh aspect, alone or in combination with one or more of the first through sixth aspects, process 400 includes receiving, from the wireless network, one or more IEs that indicate a downlink bandwidth associated with the first carrier frequency in a unit of resource blocks, and mapping the downlink bandwidth indicated in the one or more IEs to the bandwidth metric based at least in part on an SCS associated with the first carrier frequency.

In an eighth aspect, alone or in combination with one or more of the first through seventh aspects, the one or more IEs are received in a SIB while the UE is camped on the wireless network.

In a ninth aspect, alone or in combination with one or more of the first through eighth aspects, mapping the value associated with the downlink bandwidth to the bandwidth metric includes determining a maximum downlink bandwidth supported by the wireless network based at least in part on the downlink bandwidth indicated in the SIB, wherein the bandwidth metric is a highest downlink bandwidth supported by the UE that is less than or equal to the maximum downlink bandwidth supported by the wireless network.

In a tenth aspect, alone or in combination with one or more of the first through ninth aspects, mapping the value associated with the downlink bandwidth to the bandwidth metric includes determining, based at least in part on past connected mode history information, a maximum downlink bandwidth configured for the UE in a cell associated with the SIB, wherein the bandwidth metric is the maximum downlink bandwidth configured for the UE in the cell associated with the SIB.

In an eleventh aspect, alone or in combination with one or more of the first through tenth aspects, the one or more IEs are received in an RRC message while the UE is in a connected mode on the wireless network.

In a twelfth aspect, alone or in combination with one or more of the first through eleventh aspects, the bandwidth metric is a sum of bandwidth values of all downlink component carriers in a PCell and one or more SCells based at least in part on a carrier aggregation configuration associated with the UE.

In a thirteenth aspect, alone or in combination with one or more of the first through twelfth aspects, the bandwidth metric is a sum of bandwidth values of all downlink component carriers in an SCG based at least in part on a dual connectivity configuration associated with the UE.

In a fourteenth aspect, alone or in combination with one or more of the first through thirteenth aspects, the bandwidth metric is a sum of bandwidth values of all downlink component carriers in an MCG and an SCG based at least in part on a dual connectivity configuration associated with the UE.

In a fifteenth aspect, alone or in combination with one or more of the first through fourteenth aspects, the second visual indicator associated with the second version of the RAT is displayed based at least in part on a carrier aggregation or dual connectivity configuration associated with the UE including one or more component carriers in the second frequency range.

In a sixteenth aspect, alone or in combination with one or more of the first through fifteenth aspects, the RAT is a 5G or NR RAT.

In a seventeenth aspect, alone or in combination with one or more of the first through sixteenth aspects, the first carrier frequency is in a sub-6 GHz band and the second carrier frequency is in a mmW band.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
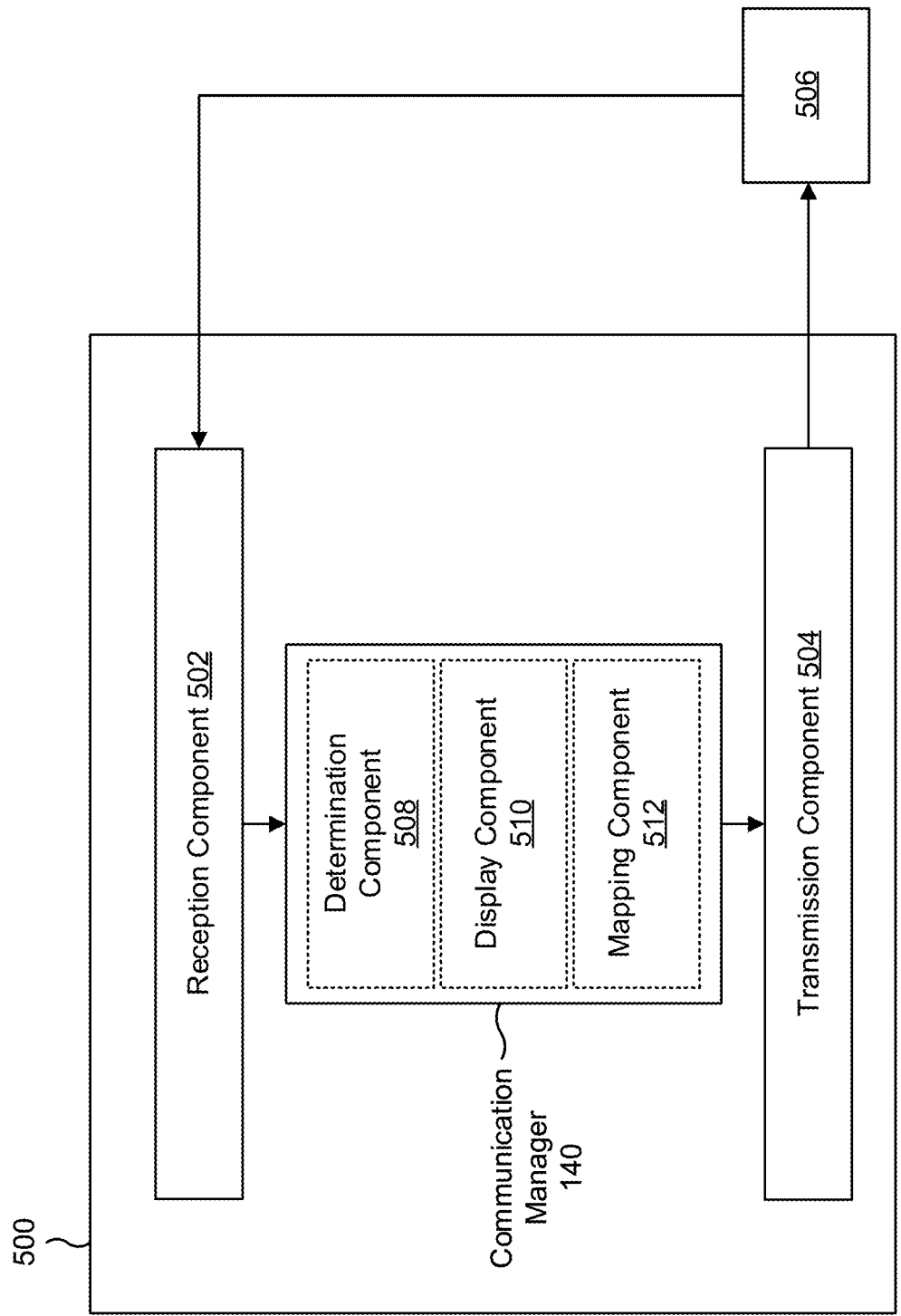
FIG. 5 is a block diagram of an example apparatus for wireless communication, in accordance with the present disclosure.

FIG. 5 is a block diagram of an example apparatus 500 for wireless communication. The apparatus 500 may be a UE, or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 1100 may include the communication manager 140. The communication manager 140 may include one or more of a determination component 508, a display component 510, or a mapping component 512, among other examples.

In some aspects, the apparatus 500 may be configured to perform one or more operations described herein in connection with FIGS. 3A-3D. Additionally, or alternatively, the apparatus 500 may be configured to perform one or more processes described herein, such as process 400 of FIG. 4. In some aspects, the apparatus 500 and/or one or more components shown in FIG. 5 may include one or more components of the UE described above in connection with FIG. 2. Additionally, or alternatively, one or more components shown in FIG. 5 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 506. In some aspects, the reception component 502 may include one or more antennas, a demodulator, a MIMO detector, a receive processor, a controller/processor, a memory, or a combination thereof, of the UE described above in connection with FIG. 2.

The transmission component 504 may transmit communications, such as reference signals, control information, data communications, or a combination thereof, to the apparatus 506. In some aspects, one or more other components of the apparatus 506 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modulator, a transmit MIMO processor, a transmit processor, a controller/processor, a memory, or a combination thereof, of the UE described above in connection with FIG. 2. In some aspects, the transmission component 504 may be co-located with the reception component 502 in a transceiver.

The determination component 508 may determine that the UE is connected to a wireless network on a first carrier frequency in a first frequency range that is associated with a lower data rate than a second carrier frequency in a second frequency range, wherein the first frequency range is associated with a first version of a RAT and the second frequency range is associated with a second version of the RAT. The determination component 508 may determine a bandwidth metric associated with the first carrier frequency in the first frequency range. The display component 510 may display a first visual indicator associated with the first version of the RAT or a second visual indicator associated with the second version of the RAT based at least in part on the bandwidth metric.

The reception component 502 may receive, from the wireless network, one or more IEs that indicate a downlink bandwidth associated with the first carrier frequency in a unit of resource blocks. The mapping component 512 may map the downlink bandwidth indicated in the one or more IEs to the bandwidth metric based at least in part on a subcarrier spacing associated with the first carrier frequency.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some Aspects of the present disclosure:

Aspect 1: A method of wireless communication performed by a UE, comprising: determining that the UE is connected to a wireless network on a first carrier frequency in a first frequency range that is associated with a lower data rate than a second carrier frequency in a second frequency range, wherein the first frequency range is associated with a first version of a RAT and the second frequency range is associated with a second version of the RAT; determining a bandwidth metric associated with the first carrier frequency in the first frequency range; and displaying a first visual indicator associated with the first version of the RAT or a second visual indicator associated with the second version of the RAT based at least in part on the bandwidth metric.

Aspect 2: The method of Aspect 1, wherein the first visual indicator associated with the first version of the RAT is displayed based at least in part on the bandwidth metric failing to satisfy a threshold.

Aspect 3: The method of any of Aspects 1-2, wherein the second visual indicator associated with the second version of the RAT is displayed based at least in part on the bandwidth metric satisfying a threshold.

Aspect 4: The method of any of Aspects 1-3, wherein the bandwidth metric is a downlink bandwidth associated with the first carrier frequency based at least in part on the first carrier frequency having an FDD configuration.

Aspect 5: The method of any of Aspects 1-3, wherein the bandwidth metric is an effective downlink bandwidth associated with the first carrier frequency based at least in part on the first carrier frequency having a time division duplexing configuration.

Aspect 6: The method of Aspect 5, wherein the effective downlink bandwidth is based at least in part on a total bandwidth associated with the first carrier frequency and a scaling factor that is based at least in part on a proportion of time resources that are allocated to downlink communication.

Aspect 7: The method of Aspect 5, wherein the effective downlink bandwidth is based at least in part on a total bandwidth associated with the first carrier frequency and a scaling factor having a configurable value stored in memory.

Aspect 8: The method of any of Aspects 1-7, further comprising: receiving, from the wireless network, one or more IEs that indicate a downlink bandwidth associated with the first carrier frequency in a unit of RBs; and mapping the downlink bandwidth indicated in the one or more IEs to the bandwidth metric based at least in part on an SCS associated with the first carrier frequency.

Aspect 9: The method of Aspect 8, wherein the one or more IEs are received in a SIB while the UE is camped on the wireless network.

Aspect 10: The method of any of Aspects 8-9, wherein mapping the value associated with the downlink bandwidth to the bandwidth metric includes: determining a maximum downlink bandwidth supported by the wireless network based at least in part on the downlink bandwidth indicated in the SIB, wherein the bandwidth metric is a highest downlink bandwidth supported by the UE that is less than or equal to the maximum downlink bandwidth supported by the wireless network.

Aspect 11: The method of any of Aspects 8-10, wherein mapping the value associated with the downlink bandwidth to the bandwidth metric includes: determining, based at least in part on past connected mode history information, a maximum downlink bandwidth configured for the UE in a cell associated with the SIB, wherein the bandwidth metric is the maximum downlink bandwidth configured for the UE in the cell associated with the SIB.

Aspect 12: The method of Aspect 8, wherein the one or more IEs are received in an RRC message while the UE is in a connected mode on the wireless network.

Aspect 13: The method of any of Aspects 1-12, wherein the bandwidth metric is a sum of bandwidth values of all downlink component carriers in a PCell and one or more SCells based at least in part on a carrier aggregation configuration associated with the UE.

Aspect 14: The method of any of Aspects 1-13, wherein the bandwidth metric is a sum of bandwidth values of all downlink component carriers in an SCG based at least in part on a dual connectivity configuration associated with the UE.

Aspect 15: The method of any of Aspects 1-14, wherein the bandwidth metric is a sum of bandwidth values of all downlink component carriers in an MCG and an SCG based at least in part on a dual connectivity configuration associated with the UE.

Aspect 16: The method of any of Aspects 1-15, wherein the second visual indicator associated with the second version of the RAT is displayed based at least in part on a carrier aggregation or dual connectivity configuration associated with the UE including one or more component carriers in the second frequency range.

Aspect 17: The method of any of Aspects 1-16, wherein the RAT is a 5G or NR RAT.

Aspect 18: The method of any of Aspects 1-17, wherein the first carrier frequency is in a sub-6 GHz band and the second carrier frequency is in a mmW band.

Aspect 19: An apparatus for wireless communication at a device, comprising a processor; memory coupled with the processor; and instructions stored in the memory and executable by the processor to cause the apparatus to perform the method of any of Aspects 1-18.

Aspect 20: A device for wireless communication, comprising a memory and one or more processors coupled to the memory, the one or more processors configured to perform the method of any of Aspects 1-18.

Aspect 21: An apparatus for wireless communication, comprising at least one means for performing the method of any of Aspects 1-18.

Aspect 22: A non-transitory computer-readable medium storing code for wireless communication, the code comprising instructions executable by a processor to perform the method of any of Aspects 1-18.

Aspect 23: A non-transitory computer-readable medium storing a set of instructions for wireless communication, the set of instructions comprising one or more instructions that, when executed by one or more processors of a device, cause the device to perform the method of any of Aspects 1-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining that the UE is connected to a wireless network on a first carrier frequency in a first frequency range that is associated with a lower data rate than a second carrier frequency in a second frequency range, wherein the first frequency range is associated with a first version of a radio access technology (RAT) and the second frequency range is associated with a second version of the RAT;
    determining a bandwidth metric associated with the first carrier frequency in the first frequency range, wherein the bandwidth metric is based at least in part on a bandwidth associated with the first carrier frequency and based at least in part on a type of duplexing of the first carrier frequency; and
    displaying a second visual indicator associated with the second version of the RAT, based at least in part on the bandwidth metric being associated with the second version of the RAT.

2. The method of claim 1, wherein the second visual indicator associated with the second version of the RAT is displayed based at least in part on the bandwidth metric satisfying a threshold.

3. The method of claim 1, wherein the bandwidth metric is a downlink bandwidth associated with the first carrier frequency based at least in part on the type of duplexing of the first carrier frequency being a frequency division duplexing configuration.

4. The method of claim 1, wherein the bandwidth metric is an effective downlink bandwidth associated with the first carrier frequency based at least in part on the type of duplexing of the first carrier frequency being a time division duplexing configuration.

5. The method of claim 4, wherein the effective downlink bandwidth is based at least in part on a total bandwidth associated with the first carrier frequency and a scaling factor that is based at least in part on a proportion of time resources that are allocated to downlink communication.

6. The method of claim 4, wherein the effective downlink bandwidth is based at least in part on a total bandwidth associated with the first carrier frequency and a scaling factor having a configurable value stored in one or more memories of the UE.

7. The method of claim 1, further comprising:
    receiving, from the wireless network, one or more information elements (IEs) that indicate a downlink bandwidth associated with the first carrier frequency in a unit of resource blocks; and
    mapping the downlink bandwidth indicated in the one or more IEs to the bandwidth metric based at least in part on a subcarrier spacing associated with the first carrier frequency.

8. The method of claim 7, wherein the one or more IEs are received in a system information block (SIB) while the UE is camped on the wireless network.

9. The method of claim 8, wherein mapping the downlink bandwidth to the bandwidth metric includes:
    determining a maximum downlink bandwidth supported by the wireless network based at least in part on the downlink bandwidth indicated in the SIB, wherein the bandwidth metric is a highest downlink bandwidth supported by the UE that is less than or equal to the maximum downlink bandwidth supported by the wireless network.

10. The method of claim 8, wherein mapping the downlink bandwidth to the bandwidth metric includes:
    determining, based at least in part on past connected mode history information, a maximum downlink bandwidth configured for the UE in a cell associated with the SIB, wherein the bandwidth metric is the maximum downlink bandwidth configured for the UE in the cell associated with the SIB.

11. The method of claim 7, wherein the mapping further comprises:
mapping the downlink bandwidth to the bandwidth metric based at least in part on a lookup table that corresponds the unit of resource blocks to the subcarrier spacing associated with the first carrier frequency.

12. The method of claim 7, wherein the one or more IEs are received in a radio resource control message while the UE is in a connected mode on the wireless network.

13. The method of claim 1, wherein the bandwidth metric is a sum of bandwidth values of all downlink component carriers in a primary cell and one or more secondary cells based at least in part on a carrier aggregation configuration associated with the UE.

14. The method of claim 1, wherein the bandwidth metric is a sum of bandwidth values of all downlink component carriers in a secondary cell group based at least in part on a dual connectivity configuration associated with the UE.

15. The method of claim 1, wherein the bandwidth metric is a sum of bandwidth values of all downlink component carriers in a master cell group and a secondary cell group based at least in part on a dual connectivity configuration associated with the UE.

16. The method of claim 1, wherein the second visual indicator associated with the second version of the RAT is displayed based at least in part on a carrier aggregation or dual connectivity configuration associated with the UE including one or more component carriers in the second frequency range.

17. A user equipment (UE) for wireless communication, comprising:
one or more memories; and
one or more processors, coupled to the one or more memories, configured to:
determine that the UE is connected to a wireless network on a first carrier frequency in a first frequency range that is associated with a lower data rate than a second carrier frequency in a second frequency range, wherein the first frequency range is associated with a first version of a radio access technology (RAT) and the second frequency range is associated with a second version of the RAT;
determine a bandwidth metric associated with the first carrier frequency in the first frequency range, wherein the bandwidth metric is based at least in part on a bandwidth associated with the first carrier frequency and based at least in part on a type of duplexing of the first carrier frequency; and
display a second visual indicator associated with the second version of the RAT, based at least in part on the bandwidth metric being associated with the second version of the RAT.

18. The UE of claim 17, wherein the second visual indicator associated with the second version of the RAT is displayed based at least in part on the bandwidth metric satisfying a threshold.

19. The UE of claim 17, wherein the bandwidth metric is a downlink bandwidth associated with the first carrier frequency based at least in part on the type of duplexing of the first carrier frequency being a frequency division duplexing configuration.

20. The UE of claim 17, wherein the bandwidth metric is an effective downlink bandwidth associated with the first carrier frequency based at least in part on the type of duplexing of the first carrier frequency being a time division duplexing configuration.

21. The UE of claim 20, wherein the effective downlink bandwidth is based at least in part on a total bandwidth associated with the first carrier frequency and a scaling factor that is based at least in part on a proportion of time resources that are allocated to downlink communication or a scaling factor having a configurable value stored in the one or more memories.

22. The UE of claim 17, wherein the one or more processors are further configured to:
receive, from the wireless network, one or more information elements (IEs) that indicate a downlink bandwidth associated with the first carrier frequency in a unit of resource blocks; and
map the downlink bandwidth indicated in the one or more IEs to the bandwidth metric based at least in part on a subcarrier spacing associated with the first carrier frequency.

23. The UE of claim 22, wherein the one or more processors, to map the downlink bandwidth to the bandwidth metric, are configured to:
determine a maximum downlink bandwidth supported by the wireless network based at least in part on the downlink bandwidth indicated in the one or more IEs, wherein the bandwidth metric is a highest downlink bandwidth supported by the UE that is less than or equal to the maximum downlink bandwidth supported by the wireless network.

24. The UE of claim 22, wherein the one or more processors, to map the downlink bandwidth to the bandwidth metric, are configured to:
determine, based at least in part on past connected mode history information, a maximum downlink bandwidth configured for the UE in a cell associated with the one or more IEs, wherein the bandwidth metric is the maximum downlink bandwidth configured for the UE in the cell associated with the one or more IEs.

25. The UE of claim 22, wherein the one or more processors, to map the downlink bandwidth to the bandwidth metric, are configured to:
map the downlink bandwidth to the bandwidth metric based at least in part on a lookup table that corresponds the unit of resource blocks to the subcarrier spacing associated with the first carrier frequency.

26. The UE of claim 17, wherein the bandwidth metric is a sum of bandwidth values of all downlink component carriers in a primary cell and one or more secondary cells based at least in part on a carrier aggregation configuration associated with the UE.

27. The UE of claim 17, wherein the bandwidth metric is a sum of bandwidth values of all downlink component carriers in one or more of a master cell group or a secondary cell group based at least in part on a dual connectivity configuration associated with the UE.

28. The UE of claim 17, wherein the second visual indicator associated with the second version of the RAT is displayed based at least in part on a carrier aggregation or dual connectivity configuration associated with the UE including one or more component carriers in the second frequency range.

29. A non-transitory computer-readable medium storing a set of instructions for wireless communication, the set of instructions comprising:

one or more instructions that, when executed by one or more processors of a user equipment (UE), cause the UE to:
  determine that the UE is connected to a wireless network on a first carrier frequency in a first frequency range that is associated with a lower data rate than a second carrier frequency in a second frequency range, wherein the first frequency range is associated with a first version of a radio access technology (RAT) and the second frequency range is associated with a second version of the RAT;
  determine a bandwidth metric associated with the first carrier frequency in the first frequency range, wherein the bandwidth metric is based at least in part on a bandwidth associated with the first carrier frequency and based at least in part on a type of duplexing of the first carrier frequency; and
  display a second visual indicator associated with the second version of the RAT, based at least in part on the bandwidth metric being associated with the second version of the RAT.

30. An apparatus for wireless communication, comprising:
  means for determining that the apparatus is connected to a wireless network on a first carrier frequency in a first frequency range that is associated with a lower data rate than a second carrier frequency in a second frequency range, wherein the first frequency range is associated with a first version of a radio access technology (RAT) and the second frequency range is associated with a second version of the RAT;
  means for determining a bandwidth metric associated with the first carrier frequency in the first frequency range, wherein the bandwidth metric is based at least in part on a bandwidth associated with the first carrier frequency and based at least in part on a type of duplexing of the first carrier frequency; and
  means for displaying a second visual indicator associated with the second version of the RAT, based at least in part on the bandwidth metric being associated with the second version of the RAT.

* * * * *